United States Patent [19]

Hoy et al.

[11] 4,321,174

[45] Mar. 23, 1982

[54] PRODUCTION OF AQUEOUS DISPERSION OF AROMATIC POLYETHERSULPHONE

[75] Inventors: Leslie R. J. Hoy, St. Neots; Peter S. Westgate, Welwyn Garden City, both of England

[73] Assignee: Imperial Chemical Industries Limited, London, England

[21] Appl. No.: 222,684

[22] Filed: Jan. 5, 1981

[30] Foreign Application Priority Data

Jan. 21, 1980 [GB] United Kingdom ............... 1888/80

[51] Int. Cl.³ ............................................. C08L 81/06
[52] U.S. Cl. .................................... 523/101; 525/390; 525/906; 528/499; 524/609; 524/508
[58] Field of Search .................. 260/29.2 R, 29.6 NR; 525/390, 906, 535; 528/499

[56] References Cited

U.S. PATENT DOCUMENTS

3,993,843 11/1976 Vasta .................................. 428/422
4,222,918 9/1980 Zentner et al. .............. 260/29.2 EP

FOREIGN PATENT DOCUMENTS

1426342 2/1976 United Kingdom .
1537851 1/1979 United Kingdom .

Primary Examiner—Theodore E. Pertilla
Attorney, Agent, or Firm—Cushman, Darby & Cushman

[57] ABSTRACT

An aqueous dispersion of an aromatic polyethersulphone of sole repeat unit

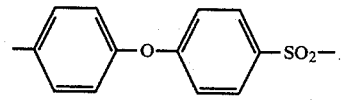

and having mean particle size below 25 μm, preferably below 12 μm, is prepared by (1) stirring the polyethersulphone in methylene chloride to form a solution and then a coarse particulate solid, (2) adding further methylene chloride to form a slurry, (3) milling the slurry to form a dispersion, (4) mixing a methylene chloride - and water-miscible liquid which does not swell the polyethersulphone with the milled dispersion, (5) filtering the dispersion and washing the wet cake with the liquid and then water, and (6) dispersing the wet cake in water, optionally with milling, to provide the aqueous dispersion.

16 Claims, No Drawings

PRODUCTION OF AQUEOUS DISPERSION OF AROMATIC POLYETHERSULPHONE

The present invention relates to a method of preparing an aqueous dispersion of an aromatic polyethersulphone.

Aqueous dispersions comprising an aromatic polyethersulphone and a tetrafluoroethylene polymer are known to be useful as coating compositions and, in particular, as compositions that exhibit non-stick properties, e.g for cookware. Such coating compositions are described in British Patent Specification No. 1,426,342.

It is desirable in the interests of coating uniformity and dispersion stability that the aromatic polyethersulphone in the aqueous dispersion has a mean particle size of below 25 µm, preferably below 12 µm. Such material can be prepared by milling, e.g ball milling, the aromatic polyethersulphone (obtained from manufacture as a coarse powder or in granular or chip form) with water in the presence of an emulsifying agent. Unfortunately, such a procedure usually takes a very long time to yield an aromatic polyethersulphone of such low particle size (e.g a week or more).

One way of reducing the milling time needed to provide aromatic polyethersulphone of such low particle size is described in British Patent Specification No. 1,537,851 and involves the use of polyethersulphone of low molecular weight, e.g having reduced viscosity (RV) below 0.25. (RV as used herein refers to viscosity measurements made at 25° C. on a solution of the polymer in dimethyl formamide containing 1 g of polymer in 100 cm$^3$ of solution). The use of such low molecular weight aromatic polyethersulphone allows the milling time to be reduced to less than 24 hours. However, the production of low molecular weight aromatic polyethersulphone requires the use of special techniques, such as polymerisation to low conversion (which entails a difficult isolation procedure) or the cleavage of longer chain molecules, and may therefore be expensive. Furthermore, the low molecular weight aromatic polyethersulphone possesses inferior physical properties in comparison to the higher molecular weight material.

We have now discovered a method for producing aqueous dispersions of an aromatic polyethersulphone having mean particle size less than 25 µm, preferably less than 12 µm, which may be prepared in a short period of time and which employs polyethersulphone of any molecular weight. In this specification the mean particle size is the weight average value as measured by a disc centrifuge.

According to the present invention there is provided a method of preparing an aqueous dispersion of an aromatic polyethersulphone of sole repeat unit

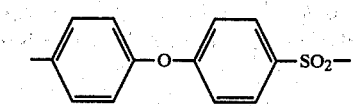

which method comprises
(1) mixing the polyethersulphone with methylene chloride and stirring the mixture so that it first forms a solution and then a coarse particulate solid,
(2) adding further methylene chloride to provide a slurry of the solid in methylene chloride,
(3) milling the slurry from stage (2) to provide a dispersion which after stages (4) to (6) results in a dispersion of mean polyethersulphone particle size as specified in stage (6),
(4) mixing the dispersion from stage (3) with a liquid which is miscible with methylene chloride and water and does not swell the polyethersulphone,
(5) filtering the dispersion from stage (4) to yield a wet cake of the polyethersulphone and washing the wet cake with the liquid which is miscible with methylene chloride and water and then with water, and
(6) dispersing the wet cake from stage (5) in water in the presence of an emulsifying agent to provide an aqueous dispersion of the polyethersulphone having mean particle size below 25 µm.

The aqueous dispersion produced after stage (6) preferably has a mean polyethersulphone particle size of below 12 µm (usually in the range 0.5 to 12 µm). Also the dispersion in stage (6) may optionally be effected with the aid of milling.

The milling operations in stage (3) and (if employed) in stage (6) (preferably ball milling) are each usually less than 24 hours (usually less than 20 hours and typically 10 to 18 hours in stage (3) and 2 to 8 hours in stage (6)) while the aromatic polyethersulphone may have RV well above 0.25, e.g 0.3–0.6.

In stage (1), the aromatic polyethersulphone first dissolves in the methylene chloride to form a syrup-like solution but then, with continued stirring, the solution changes fairly quickly to a coarse particulate solid—though to be a crystalline complex between the polyethersulphone and methylene chloride. The amount of methylene chloride to employ in this stage is not critical but an amount which contains 10–40% by weight of the polyethersulphone, particularly 15–25% by weight, has been found to be convenient.

The addition of further methylene chloride in stage (2), conveniently with continued stirring, does not redissolve the polyethersulphone, but instead a slurry of the solid in methylene chloride is formed.

The milling operation in stage (3) to provide polyethersulphone of low particle size is quite rapid as mentioned above. The slurry undergoing milling preferably contains an emulsifying agent, particularly a hydrophobic surfactant (suitable for use with non-aqueous dispersions) such as 'Triton' X 45 (sold by the Rohm and Haas Company). After the milling operation it is not possible to immediately replace the methylene chloride with water, e.g by filtering and redispersion in water, or by pouring the methylene chloride dispersion directly into water, because a sticky mass ensues with total loss of particulation. Thus in stages (4) and (5) the methylene chloride is removed from the polyethersulphone using a liquid which is miscible with methylene chloride and water but does not swell the polyethersulphone before contacting the polymer with water. Preferably the methylene chloride—and water-miscible liquid is a water-miscible alcohol, particularly methanol or ethanol. It is important that the polyethersulphone wet cake in stage (4) does not dry out, otherwise the particles reagglomerate.

Finally in stage (6) the water-wet cake from stage (5) is dispersed, optionally with milling, in water to yield the aqueous dispersion according to the invention. The milling operation in stage (6) (if employed) is not thought to further reduce the particle size of the polyethersulphone significantly, but aids good dispersion. The dispersion in stage (6) should be carried out in the presence of an emulsifying agent, preferably a hydrophylic surfactant (suitable for use with aqueous dispersions), e.g 'Triton' X 100 (Polyoxyethylated octyl phenol containing 9-10 mols of ethylene oxide per mole of octyl phenol, sold by the Rohm and Haas Company).

The resulting aqueous dispersion according to the invention may be converted into a composition containing tetrafluoroethylene polymer and aromatic polyethersulphone by dispersion of a powder of the tetrafluoroethylene polymer into the polyethersulphone dispersion or by mixing an aqueous dispersion of the tetrafluoroethylene polymer with the polyethersulphone dispersion.

The method of the invention is limited to the use of aromatic polyethersulphone having only the repeat unit:

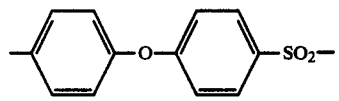

as it has been found that the method will not work with other types of polyethersulphone, e.g with polyethersulphone homopolymer having repeat units of formula:

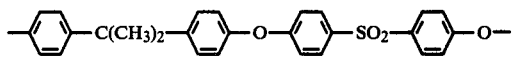

('Udel'; Union Carbide Corporation) or with a copolymer having repeat units of formulae:

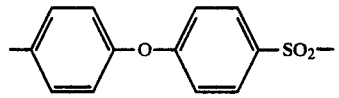

and

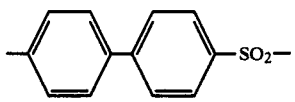

('720P'; ICI). When these polymers are used, it is not possible to form a solid in stage (1).

The present invention is now illustrated by the following examples.

EXAMPLE 1

An aromatic polyethersulphone homopolymer (50 g) (coarse powder) having repeat unit of formula:

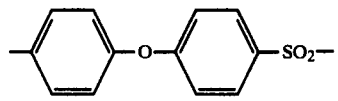

and RV approximately 0.4 was stirred in methylene chloride (250 g). The polyethersulphone first dissolved to form a syrup-like solution, and then the solution solidified into coarse particles after about 30 minutes. Further methylene chloride was added (stirring being continued) to form a slurry of the particles. 'Triton' X 45 emulsifying agent (2.5 g) was added. The slurry was ball milled for 16 hours to form a finely divided dispersion of the polyethersulphone in the methylene chloride. Methanol was added to the ball milled dispersion which was then filtered. The residue, in the form of a wet cake, was washed with methanol and then with water. The water-wet cake was dispersed in water containing 'Triton' X 100 emulsifying agent, the relative amounts by weight of polyethersulphone, water and 'Triton' X 100 being 12.60, 85.40, and 1.26 respectively. The dispersion was ball milled for about 4 hours. The aqueous dispersion formed in this example had a mean polyethersulphone particle size of about 11 μm.

EXAMPLE 2

An aromatic polyethersulphone homopolymer (50 g) (coarse powder) having the repeat unit of formula:

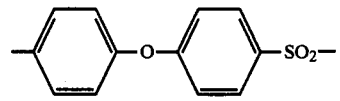

and RV 0.53 was stirred in methylene chloride (250 g). The polyethersulphone first dissolved (after about 30 minutes) to form a syrup-like solution, and then the solution solidified into coarse particles after about 30 minutes. Further methylene chloride (250 g) was added (stirring being continued) to form a slurry of the particles to which 'Triton' X 45 emulsifying agent (2.5 g) was added. The slurry was ball milled for 16 hours to form a finely divided dispersion of the polyethersulphone in the methylene chloride. Methanol was added to the ball milled dispersion which was then filtered. The residue, in the form of a wet cake, was washed several times with methanol (allowing the methanol to filter off between each washing) and then dispersed into water, filtered, and washed several times with water (allowing the water to filter off between each washing). The resulting water-wet cake was dispersed in water (the dispersion having a solids content of 9% by weight) and 'Triton' X 100 emulsifying agent (10% by weight, based on the weight of polyethersulphone) added. The dispersion was ball milled for about 2 hours. The aqueous dispersion formed in this example had a mean particle size of about 4 μm.

EXAMPLE 3

An aromatic polyethersulphone homopolymer (50 g) (granules) having repeat unit of formula:

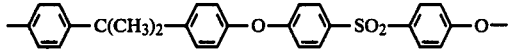

('Udel' P 1700 Natural) was stirred in methylene chloride (250 g). The polyethersulphone dissolved after about 1 hour. After being stirred for 4 hours, however, the solution had not solidified and the experiment was abandoned.

EXAMPLE 4

An aromatic polyethersulphone copolymer (50 g) (coarse powder) having repeat units of formulae

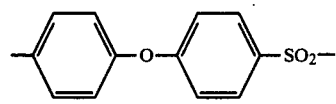

and

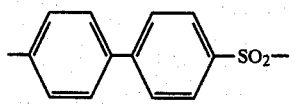

('720P') was stirred in methylene chloride (250 g). The polyethersulphone dissolved after about 30 minutes. After being stirred for 4 hours, however, the solution had not solidified and the experiment was abandoned.

We claim:

1. A method of preparing an aqueous dispersion of an aromatic polyethersulphone of sole repeat unit:

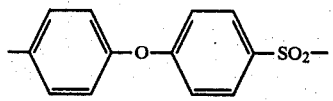

which method comprises
(1) mixing the polyethersulphone with methylene chloride and stirring the mixture so that it first forms a solution and then a coarse particulate solid,
(2) adding further methylene chloride to provide a slurry of the solid in methylene chloride,
(3) milling the slurry from stage (2) to provide a dispersion which after stages (4) to (6) results in a dispersion of mean polyethersulphone particle size as specified in stage (6),
(4) mixing the dispersion from stage (3) with a liquid which is miscible with methylene chloride and water and does not swell the polyethersulphone,
(5) filtering the dispersion from stage (4) to yield a wet cake of the polyethersulphone and washing the wet cake with the liquid which is miscible with methylene chloride and water and then with water, and
(6) dispersing the wet cake from stage (5) in water in the presence of an emulsifying agent to provide an aqueous dispersion of the polyethersulphone having mean particle size below 25 μm.

2. A method according to claim 1 wherein the dispersion in stage (6) is effected with the aid of milling.

3. A method according to claim 1 wherein the aqueous dispersion produced after stage (6) has a mean polyethersulphone particle size of less than 12 μm.

4. A method according to claim 1 wherein in stage (4) stirring is continued while the further methylene chloride is added.

5. A method according to claim 1 wherein milling is effected by ball milling.

6. A method according to claim 2 wherein the milling operation in stage (6) is effected in 2 to 8 hours.

7. A method according to claim 1 wherein the milling operation in stage (3) is effected in less than 24 hours.

8. A method according to claim 7 wherein the milling operation in stage (3) is effected in 10 to 18 hours.

9. A method according to claim 1 wherein the amount of methylene chloride used in stage (1) is that which contains 10 to 40% by weight of the polyethersulphone.

10. A method according to claim 1 wherein the milling in stage (3) is carried out in the presence of an emulsifying agent.

11. A method according to claim 10 wherein the emulsifying agent employed in stage (3) is a hydrophobic surfactant.

12. A method according to claim 1 wherein the emulsifying agent employed in stage (6) is a hydrophilic surfactant.

13. A method according to claim 1 wherein the liquid which is miscible with methylene chloride and water employed in stages (4) and (5) is a water-miscible alcohol.

14. A method according to claim 13 wherein the water-miscible alcohol used is methanol or ethanol.

15. A method according to claim 1 when the polyethersulphone employed has RV in the range 0.3 to 0.6.

16. A method according to claim 1 wherein the aqueous dispersion produced after stage (6) has thereafter dispersed into it a powder of a tetrafluoroethylene polymer or is mixed with an aqueous dispersion of a tetrafluoroethylene polymer.

* * * * *